United States Patent [19]

Filderman

[11] Patent Number: 4,924,989
[45] Date of Patent: May 15, 1990

[54] AUTOMATIC CLUTCH CONTROL SYSTEM FOR COUPLING TWO ROTATING SHAFTS

[75] Inventor: René Filderman, Neuilly sur Seine, France

[73] Assignee: Valeo, Paris, France

[21] Appl. No.: 275,103

[22] Filed: Nov. 22, 1988

[30] Foreign Application Priority Data

Nov. 25, 1987 [FR] France ............................... 87 16368

[51] Int. Cl.$^5$ ...................... F16D 23/10; F16D 31/04
[52] U.S. Cl. .................................... 192/103 F; 192/61
[58] Field of Search ................... 192/103 F, 6; 74/711; 180/233, 249

[56] References Cited

U.S. PATENT DOCUMENTS

| | | |
|---|---|---|
| 3,131,582 | 5/1964 | Kelbel . |
| 3,686,976 | 8/1972 | Philippi ............................ 74/711 |
| 3,741,040 | 6/1973 | Shaw .............................. 192/61 X |
| 3,752,280 | 8/1973 | Cheek ....................... 192/103 F X |
| 3,974,900 | 8/1976 | Park ................................ 192/61 |
| 4,057,133 | 11/1977 | Tuzson ......................... 192/103 F |
| 4,214,652 | 7/1980 | Quenneville ................. 192/61 X |
| 4,298,085 | 11/1981 | Moroto et al. .............. 74/711 X |
| 4,462,271 | 7/1984 | Stieg ............................. 74/711 |
| 4,727,966 | 3/1988 | Hiramatsu et al. ........ 192/103 F X |
| 4,817,751 | 4/1989 | Asano et al. ............... 192/103 F X |
| 4,821,604 | 4/1989 | Asano ......................... 192/103 F X |

FOREIGN PATENT DOCUMENTS

| | | |
|---|---|---|
| 228697 | 7/1987 | European Pat. Off. ........ 192/103 F |
| 516334 | 1/1931 | Fed. Rep. of Germany . |
| 1088292 | 2/1961 | Fed. Rep. of Germany . |
| 1140410 | 5/1963 | Fed. Rep. of Germany . |
| 2135983 | 12/1972 | France . |
| 177321 | 8/1987 | Japan ................................ 192/61 |
| 612652 | 11/1948 | United Kingdom ............ 192/103 F |
| 972373 | 10/1964 | United Kingdom . |

Primary Examiner—Randolph A. Reese
Assistant Examiner—John A. Ricci
Attorney, Agent, or Firm—Charles E. Brown; Charles A. Brown

[57] ABSTRACT

The object of the invention is to provide an automatic clutch control system for coupling two rotating shafts. The system comprises a piston axially movable towards an engaged position to provide the axial clamping of at least one friction disc forming part of a hydraulically controlled clutch mounted between two shafts. A control member responsive to the difference in speed between the shafts moves the piston towards its engaged position and is advantageously constituted by a lobed pump having a central pinion, an inner crown, eccentric relative to the pinion, and an outer crown centered relative to the pinion. The pinion is fixed for rotation on one of the shafts while the outer crown is integral in rotation with the other of the shafts.

8 Claims, 2 Drawing Sheets

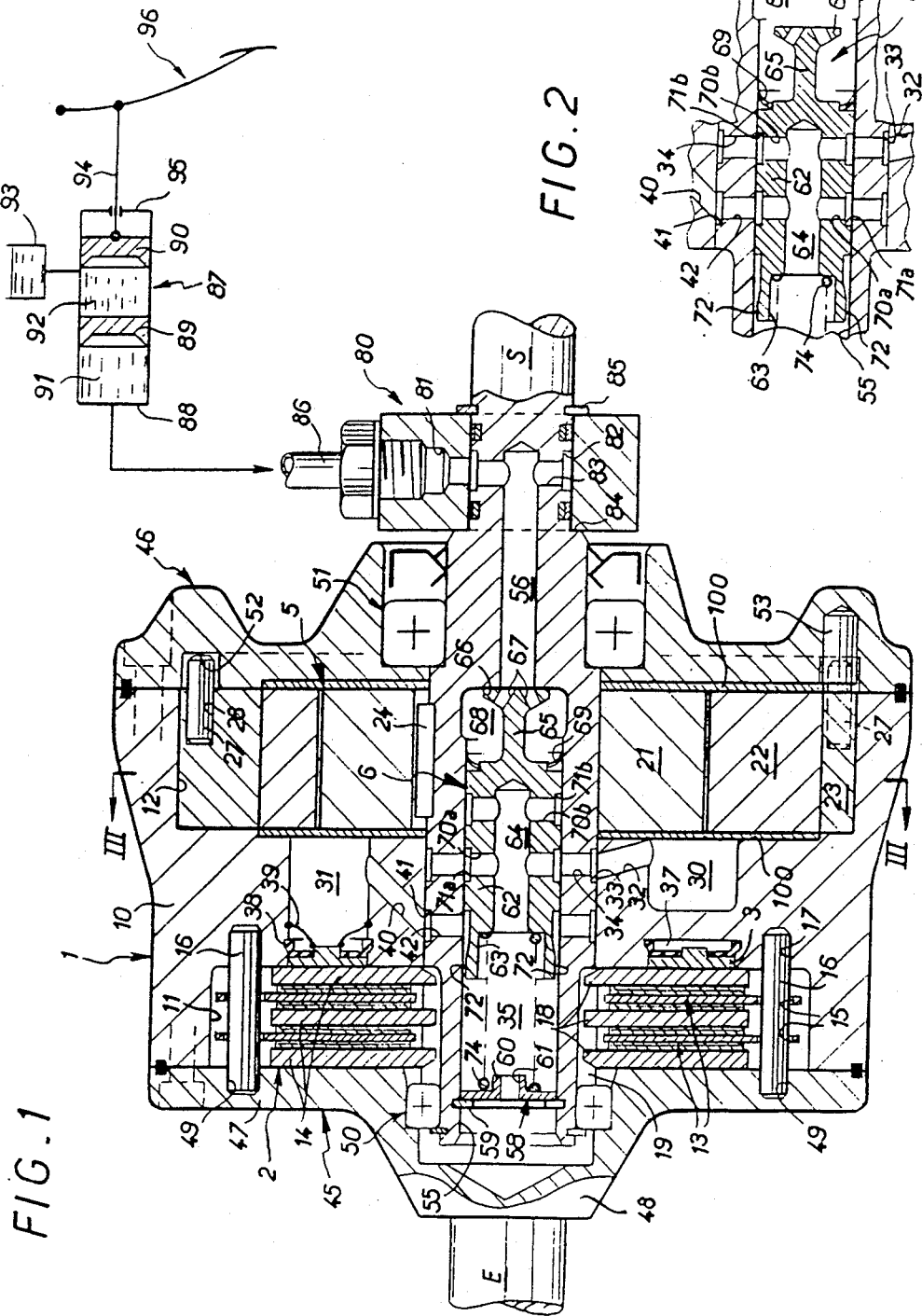

AUTOMATIC CLUTCH CONTROL SYSTEM FOR COUPLING TWO ROTATING SHAFTS

FIELD OF THE INVENTION

The present invention relates generally to an automatic clutch control system for coupling two rotating shafts, and its object more specifically is to provide an automatic clutch control system for an automobile vehicle for coupling a driving shaft associated with the front axle, for example, to a driven shaft associated with the rear axle, so as to enable the vehicle to be temporarily and automatically put into a four wheel drive mode, especially when the front and rear wheels turn at different speeds.

In general, these clutches are controlled hydraulically and comprise, in a hollow chamber, a piston which is axially movable between two positions, namely a position of engagement in which, driven by a fluid under pressure, it provide the axial clamping against a flange or reaction plate of at least one friction disc, and a disengaged position in which it frees the friction disc, and elastic return means which constantly urge the piston towards its disengaged position.

BACKGROUND OF THE INVENTION

French Patent No. - FR-2 135 983 describes a torque converter for an automobile vehicle which enables the engine torque to be distributed differently to the front and rear axles when a difference in speed occurs between the front and rear wheels. This converter comprises a hydraulic coupling which produces a torque starting from a predetermined difference in speed, this torque causing the axial displacement of a ring which in its turn acts on the pressure plate of a multi-disc clutch mounted between the two shafts.

However, the hydraulic coupling must itself provide the clutch control and must be able to transmit relatively large torques.

Another disadvantage is that the control of the multi-disc clutch is realized by means of rollers which are displaced on ramps to cause displacement of the ring which acts on the pressure plate of the clutch. Such a structure is complex by nature and imposes the need for exact machining of the ramps to avoid any possible jamming of the rollers.

The object of the invention is to overcome these disadvantages and in a general manner proposes for this purpose a system which substitutes for a mechanical control, a hydraulic control of the coupling clutch responsive to a difference in speed between the two shafts.

SUMMARY OF THE INVENTION

The invention proposes for this purpose an automatic clutch control system for coupling two rotating shafts, of the kind comprising an element, such as a piston, axially movable towards a position of engagement to provide the axial clamping of at least one friction disc in the clutch for coupling the shafts, and a control member, responsive to a difference in speed between the said shafts, to control the displacement of the said piston towards its engaged position, characterized in that the control member is constituted by a lobed pump comprising a central pinion the teeth of which mesh with teeth of complementary shape provided on the internal periphery of an inner crown, eccentric relative to the pinion, an outer crown the internal periphery of which is centred relative to the inner crown and the external periphery of which is centred relative to the pinion; and a chamber for admitting fluid and a chamber for returning the fluid transferred by the pump from the admission chamber; and wherein the pinion of the pump is integral in rotation with one of the shafts and the outer crown is integral in rotation with the other of the said shafts.

When the shafts turn substantially at the same speed, the pump transfers a substantially constant volume of fluid between its admission chamber and its return chamber. The system is designed in such a way the member for controlling the piston remains inactive in response to this transfer of fluid, and the clutch is in the uncoupled position. In contrast, a difference in speed between the two shafts entrains an increase in the volume of fluid transferred between the admission and return chambers of the pump which is converted into an increase in pressure which serves to drive the piston towards its engaged position where it provides coupling of the clutch, thus making the vehicle a four wheel drive vehicle.

For this purpose the admission chamber of the pump communicates permanently with a reservoir of fluid in the hollow end of one of the shafts, whereas the return chamber of the pump communicates with this reservoir through a restriction which limits the cross-section of the fluid channel.

According to the invention the system is completed by an device inhibiting the coupling of the two shafts following a braking action, for example. This device is substantially constituted by a slide valve mounted for axial movement in the hollow end of the shaft containing the fluid reservoir. As a result of a braking action, the slide is displaced towards a position in which the return chamber communicates directly with the reservoir so as to short circuit the restriction and thus to suppress the increase in pressure necessary for displacement of the piston towards its engaged position.

Other advantages, characteristics and features will emerge from the explanatory description which follows with reference to the attached drawings, and which is given by way of example only.

BRIEF DESCRIPTION OF THE DRAWINGS

FIG. 1 is a view in axial section of a clutch control system according to the invention, FIG. 2 is a partial view of FIG. 1 to show the system in a second position, particularly in case of braking of the vehicle.

DESCRIPTION OF THE PREFERRED EMBODIMENT

Figure 3:
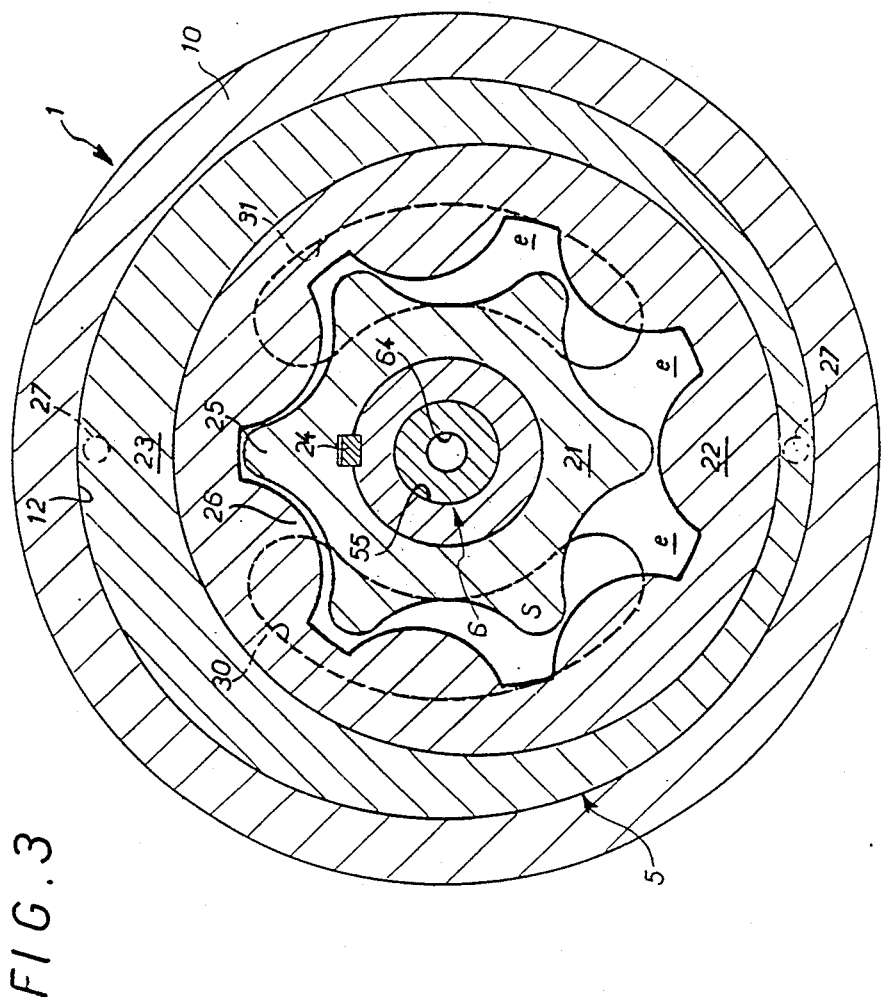
FIG. 3 is a view in section along the line III—III in FIG. 1.

The automatic control system for a clutch is illustrated in the application to the temporary coupling of two axially aligned rotating shafts E, S. The shaft E is, for example, a driving shaft connected to the gear box (not shown) of an automobile vehicle to entrain the driven wheels of the front axle, and the shaft S is a driven shaft associated with the rear axle.

Overall, the system comprises a connecting piece 1 integral with shaft E of the shafts E, S and in which is housed a multi-disc clutch 2, which provides the coupling of the two shafts E, S as a result of the action of an axially movable piston 3. The displacement of the piston 3 is provided by a control member 5 of the hydraulic kind responsive to a difference in speed between the shafts E and S. The system is completed by a slide valve 6, mounted for axial movement in the hollow end part of the output shaft S, which inhibits the action of the hydraulic control member 5, in particular in the case of braking of the vehicle.

The piece 1 comprises a hub 10 mounted around the hollow end part of the shaft S. The two transverse end faces of the hub 10 present respectively two axially aligned bored recesses 11, 12. Clutch 2 is housed in the bored recess 11 adjacent to the input shaft E. Clutch 2 is a hydraulically controlled multi-disc clutch comprising at least one friction disc, and in this example two friction discs 13 between which are interposed three discs 14. The discs 13 which extend radially beyond the discs 14 are each pierced by several orifices 15 axially aligned from one disc to another with axial guide pegs 16 passing through them which, at one end, are respectively engaged in blind holes 17 made in the bottom of the bored recess 11. These pegs 16 centre the friction discs 13 around the output shaft S and fix them in rotation with the hub 10 whilst allowing an axial displacement of the discs. The discs 14 are fixed in rotation on the output shaft S, whilst being free axially, by means of teeth 18 provided on their internal periphery which cooperate with grooves 19 made axially in the external periphery of the output shaft S.

Referring to FIGS. 1 and 3, the control member 5 is constituted by a lobed pump housed in the bored recess 12 of the hub 10. This pump 5 comprises successively, between the output shaft S and the side wall of the bored recess 12, a central pinion 21 and two crowns, namely an inner 22 and an outer 23. The pinion is fixed in rotation on the output shaft S and is integrated in rotation with the latter by means of a key 24. The teeth 25 of the pinion 21 mesh with the larger and rounded teeth provided on the internal periphery of the inner crown 22 which is mounted eccentrically relative to the pinion 21, the latter prossessing one tooth less than the inner crown 22. The outer crown 23 is mounted around the inner crown 22 and presents an internal peripheral surface centred relative to the crown 22, and thus eccentric relative to the pinion 21, and an external peripheral surface, substantially in contact with the side wall of the bored recess 12, and centred relative to the pinion 21, this crown 23 forming an eccentric. As shown in FIG. 3, the structure of the pump 5 is such that the teeth 25 of the pinion 21 mesh with a part of the teeth 26 of the inner crown 22, in a manner to define between the teeth 25 and 26 which are not meshed, spaces e, with variable geometry, which are successively in communication with an admission chamber 30 to be refilled with fluid and with a return chamber 31 to remove the fluid imprisoned in these spaces e.

In the transverse end face of the outer crown 23, away from the bottom of the bored recess 12, two diametrically opposite axial locating pegs 27 are each engaged at one end in a notch 28 and project at their other end beyond the said face.

The pump 5 cooperates with the admission chamber 30 and the return chamber 31. Chamber 30 is formed by a crescent made in the bottom of the bored recess 12 and disposed facing teeth 25 and teeth 26. Chamber 30 communicates through a channel 32 with a groove 33 made in the external periphery of the shaft S. The groove 33 itself communicates with radial channels 34 which open into the inside of the hollow end of the output shaft S forming a reservoir of fluid 35. The return chamber 31 is formed by a crescent likewise made in the bottom of the bored cavity 12, but diametrically opposite to the admission chamber 30.

Chamber 31 opens into an annular cavity 37 machined in the bottom of the bored recess 11 and in which is mounted an annular disc forming piston 3 axially movable in this cavity 37, the depth of which is greater than the thickness of the piston 3. Piston 3 supports a membrane 38 forming a sealing joint on its face adjacent to the pump 5. A plurality of spring plates 39 fixed to piston 3 ensure its return to a position such that it does not exert any pressure on the adjacent disc 14 of the clutch 2.

The return chamber 31 communicates by means of a channel 40 with a groove 41 made is the external periphery of the shaft S. This groove 41 itself communicates with radial channels 42 which open into the reservoir 35. The connecting piece 1 is completed by two capping pieces 45, 46 which respectively come to bear against the two transverse faces of the hub 10.

The capping piece 45 is formed by a transverse annular flange 47 the internal periphery of which is prolonged by a central hollow boss 48 fixed to the shaft E. The transverse face of the flange 47, on the opposite side to the boss 48, bears against the face of the hub 10 in which the clutch 2 is housed. The flange 47 and the hub 10 are fixed to one another by conventional means which are not shown. The pegs 16 each penetrate into a notch 49 made in the adjacent face of the flange 47.

The free end of the shaft S penetrates into the interior of the boss 48 of the capping piece 45, the latter being mounted to rotate freely relative to the output shaft S by means of a roller bearing 50 interposed between the inner peripheral surface of the boss 48 and the outer peripheral surface of the end of the shaft S. The annular capping piece 46 is mounted, forming a seal, to rotate freely around the output shaft S as the result of the interposition of a roller bearing 51, and bears against the transverse face of the hub 10 in which the pump 5 is housed. The transverse face of the capping piece 46 bearing against the hub 10 comprises a circular groove 52 in which the free ends of the pegs 27 freely engage. A peg 53 forming a stop against which one of the two indexing pegs 27 comes to bear is mounted in the groove 52. This arrangement enables the pump to be operated in both directions of rotation. The capping piece 46 is fixed to the hub 10 by conventional means which are not shown. Thus, the input shaft E and the connecting piece 1 consisting of the hub 10 and the capping pieces 45, 46 form a unitary assembly mounted to rotate relative to the output shaft S.

At its end adjacent to the shaft E, the shaft S presents an axial bore 55 prolonged by an axial blind hole 56 having a smaller diameter. The slide valve 6 is mounted axially movable inside the bore 55. A washer 58, having a diameter slightly less than that of the bore 55, is mounted transversely inside the bore 55 towards the open end of the latter. The washer 58 is fixed by means of a circlip 59 engaged in a groove provided in the internal periphery of the bore 55. The face of the washer 58 adjacent to the slide valve 6 presents a central boss 60 with an axial hole 61 running through.

The slide valve 6 comprises a cylindrical central body 62 in sliding contact by its outer periphery with the internal peripery of the bore 55. At its end adjacent to the washer 58, the slide valve presents an axial bore 63 prolonged by an axial blind hole 64 having a smaller diameter. At its opposite end to the washer 58, the slide valve 6 is prolonged by an axial stem 65 terminated by a circular flange 66 the end surface of which has a diameter greater than that of the blind hole 56. In the position shown in FIG. 1, the end surface of the circular flange 66 is in contact with the bottom of the bore 55. Oblique channels 67 machined in the circular flange 66 connect the hole 56 to a chamber having a variable volume 68 delimited between the slide valve 6 and the bottom of the bore 55. A membrane 69 fixed to the periphery of the surface of the end of the slide valve 6 ensures the sealing of the chamber 68. Two series of radial channels 70a, 70b are machined in the body 62 of the slide valve 6 and open out, on the one hand, into the hole 64 and, on the other hand, into two grooves 71a, 71b, respectively, provided in the external periphery of the slide valve 6.

Towards its end adjacent to the washer 58, the external periphery of the slide valve 6 presents a restriction such as a flat part 72 and communicates with the reservoir 35, the body 62 of the slide valve 6 presenting between the flat part 72 and the adjacent end of the slide valve a diameter less than that of the bore 55. In the present case two diametrically opposite flat parts 72 are provided. Alternatively a V shape may be involved or any other capillary shape depending on the loss of pressure desired. A return spring 74 is mounted between the washer 58 and the adjacent end surface of the slide valve 6, this spring bearing at one end against the bottom of the bore 63 and, at the other end, against the washer 58 around its boss 60. The spring 74 maintains the slide valve 6 bearing in the bottom of the bore 55 of the shaft S.

The reservoir 35 is thus formed by the part of the bore 55 comprised between the slide valve 6 and the washer 58.

A revolving joint 80 is mounted around the shaft S outside the connecting piece 1 and possesses a radial channel 81 which communicates with a groove 82 machined in the outside periphery of the shaft S. This groove 82 communicates through radial channels 83 with the blind hole 56 which extends inside the shaft S beyond the connecting piece 1. The joint 80 is fixed in rotation against a shoulder 84 of the shaft S and held in position by a circlip 85. The channel 81 is connected to an external pipe 86 which opens at the other end into a cylindrical container 87 across a wall 88 of this container. Two separate pistons 89, 90 are mounted for axial movement inside the container 87 in a direction perpendicular to the wall 88 of the container. A first variable volume chamber 91 is delimited between the wall 88 and the piston 89, this chamber 91 being filled with a mineral oil. A second chamber 92 delimited between the two pistons 89 and 90 is filled with another liquid and is permanently connected to a reservoir 93 of this liquid. The piston 90 is connected to a control shaft 94 which passes through the wall 95 of the container which is opposite to the wall 88, this shaft 94 being connected to the brake pedal 96 which provides control of the displacement of the piston 90.

The operating principle of the automatic control system will be described hereinafter.

In the position of the system as shown in FIG. 1, it will be assumed that the two shafts E, S are not coupled, that they rotate at substantially the same speed, and that no force is exerted on the brake pedal 96. The drive shaft E entrains in its rotation the connecting piece 1 and the associated capping pieces 45, 46, as well as the friction discs 13 and the external crown 23 of the pump 5. The driven shaft S entrains in rotation the interposed discs 14 of the clutch 2 and the internal crown of the pump as a result of the meshing of their teeth 25, 26.

Under these conditions the teeth 25, 26 rotate at the same speed and the pump 5 provides the displacement of a constant fixed volume of fluid between the admission chamber and the return chamber 31. The chamber 30 is permanently connected to the reservoir 35. In the position of the system shown in FIG. 1, this connection is provided by the channels 32 in the hub 10, 34 in the output shaft S and 70a in the slide valve 6.

The separate spaces e delimited between the pinion 21 and the inner crown 22 are successively filled with fluid during their passage in front of the admission chamber 30 and imprison the fluid until the time when they successively become connected with the return chamber 31.

The fluid is thus displaced in a constant manner into the return chamber 31 and escapes towards the reservoir 35 of fluid through the channels 40 in the hub 10 and 42 in the output shaft S and through the restriction 72 provided level with slide valve 6.

As long as the shafts E, S rotate substantially at the same speed, the pressure of fluid inside the return chamber 31 is not sufficient to displace the piston 3 towards its position for coupling the discs 13 and 14.

If it is now supposed that there is a difference in speed between the shafts E, S caused, for example, by slipping of the front or rear wheels of the automobile vehicle. This difference in speed is expressed as a difference in speed between the pinion 21, associated with the inner crown 22, and the outer crown 23 centred on a different axis to the pump 5, with, as a consequence, an increase in volume of fluid transferred between the chambers 30 and 31. Taking into account the difference in speed and eccentricity of the crowns 22 and 23, the teeth 25 and 26 do not turn at the same speed, so that the volume between the teeth 25 and 26 alters and a certain quantity of liquid is transferred from chamber 30 to chamber 31. This increase in volume in the return chamber 31, a function of the difference in speed, is expressed in an increase in the pressure in this chamber as a result of the presence of the restriction 72 which limits the passage of fluid between the chamber 31 and the reservoir 35. This increase in pressure is reflected on the piston 3 which is then displaced towards its position providing sufficient axial clamping between the discs 13 and 14. The shafts E, S are thus coupled in rotation and the automobile vehicle then has four wheel drive. As soon as the shafts E, S again turn substantially at the same speed, the spring cups 39 return piston 3 towards its disengaged position and the shafts E, S are uncoupled again.

As emerges from the description, the outer crown 23 may assume two positions relative to the shaft E, these two positions at 180° to one another being defined by the stop 53 against which one of the indexing pegs 27 comes to bear. This position is automatically defined depending on the direction of rotation of the shaft E and enables a transfer of fluid to be provided in the same direction of circulation, from the admission chamber 30 towards the return chamber 31, independently of the direction of rotation of the shaft E.

In the case of deceleration of the vehicle, particularly as a result of braking, for example, it is preferable to uncouple the shafts E, S.

The braking action controlled by the brake pedal 96 entrains, through the intermediary of the connecting rods 94, axial displacement of the piston 90 which, in compressing the fluid contained in the chamber 92, causes displacement of the piston 89. The latter compresses the fluid contained in the chamber 91 so that the pressure of this fluid increases in the pipe 86 and is transferred into the blind hole 56 in the output shaft S across the revolving joint 80. This increase in pressure is exerted on the end surface of the circular flange 66 of the slide valve 6 and, above a certain threshold, becomes greater than the return force exerted by the spring 74 on the slide valve 6 and entrains the displacement of the latter towards the position shown in FIG. 2.

In this position the admission chamber 30 is always connected with the reservoir 35 by the channels 33 and 34 and the channels 70b of the slide valve instead of the channels 70a. The return chamber 31 no longer communicates with the reservoir 35 through the restriction 72, but directly through the channels 70a of the slide valve 6. Under these conditions the pressure initially exerted on the piston 3 as a result of the restriction 72 is annulled by putting the return chamber 31 in direct communication with the reservoir 35. As soon as the action on the brake pedal 96 is removed, the return spring 74 returns the slide valve 6 to the initial position shown in FIG. 1.

The setting of the value of the difference in speed between the shafts E, S above which the system comes into action is chosen so that the speed differences which may occur under normal conditions of use of the vehicle will be insufficient to activate the system.

Thus, as emerges from the description, a certain pressure exists inside the bored recess 12 when the shafts E and S do not rotate at the same speed. Advantage is taken of this to compress inserts 100 disposed between the walls of the bored recess and the pinion 21 and the crown 22.

These inserts are the equivalent of friction discs 13, so that the number of the latter may be reduced.

What is claimed is:

1. An automatic control system for a clutch for coupling two rotating shafts, of the kind comprising an element, such as a piston, axially movable towards a position of engagement to provide the axial clamping of at least one friction disc to said clutch for coupling said shafts, and a control member, responsive to a difference in speed between said shafts, to control the displacement of said piston towards its engaged position; wherein said control member is constituted by a lobed pump comprising a central pinion with teeth of which mesh with teeth of complementary shape provided on the internal periphery of an inner crown which is eccentric relative to the pinion; an outer crown the internal periphery of which is centred relative to the inner crown, and the external periphery of which is centred relative to the pinion; a chamber for admitting fluid defining an admission chamber, and a return chamber; said pinion being wedged on one of said shafts and said outer crown being integral in rotation with the other of said shafts, a connecting piece such as a hub being integral in rotation with one of said shafts, said clutch and said pump being housed in said hub by means of two bored recesses provided respectively in the two end surfaces of said hub.

2. A system according to claim 1, wherein said admission chamber is in permanent communication, through separate channels with a reservoir of fluid formed in the hollow end part of one of said shafts.

3. A system according to claim 2, wherein said return chamber communicates through the separate channels and a restriction with the reservoir, said restriction creating an increase in pressure in said return chamber with each increase in amount of fluid transferred between said chambers by said pump with said increase in pressure controlling the displacement of said piston towards its position of engagement.

4. A system according to claim 3, wherein said piston is an annular piston mounted in an annular cavity into which said return chamber opens.

5. A system according to claim 3, wherein said cavity is machined in the bottom wall of the bored recess in said hub where said clutch is housed.

6. A system according to claim 1, wherein said admission and return chambers are machined in the bottom wall of the bored recess in said hub where said pump is housed.

7. An automatic control system for a clutch for coupling two rotating shafts, of the kind comprising an element, such as a piston, axially movable towards a position of engagement to provide the axial clamping of at least one friction disc of said clutch for coupling said shafts, and a control member, responsive to a diference in speed between said shafts, to control the displacement of said piston towards its engaged position; wherein said control member is constituted by a lobed pump comprising a central pinion with teeth of which mesh with teeth of complementary shape provided on the internal periphery of an inner crown which is eccentric relative to the pinion; an outer crown the internal periphery of which is centred relative to the inner crown, and the external periphery of which is centred relative to the pinion; a chamber for admitting fluid defining an admission chamber, and a return chamber; said pinion being wedged on one of said shafts and said outer crown being integral in rotation with the other of said shafts, said system being completed by a device for inhibiting said control member comprising a slide valve mounted for axial movement in a hollow end of the shaft and the displacement of which is controlled by a fluid acted upon by an external element such as a brake pedal.

8. A system according to claim 7, wherein said slide valve is hollow and communicates, on the one hand, with said reservoir and, on the other hand, by radial channels with said admission chamber in the resting position of the slide valve or by said channels with said return chamber in the inhibiting position of the slide valve.

* * * * *